(12) United States Patent
Oda

(10) Patent No.: US 7,599,038 B2
(45) Date of Patent: Oct. 6, 2009

(54) DISPLAY APPARATUS AND MANUFACTURING METHOD OF DISPLAY APPARATUS

(75) Inventor: Nobuhiko Oda, Hashima (JP)

(73) Assignee: Epson Imaging Devices Corp., Nagano (JP)

( * ) Notice: Subject to any disclaimer, the term of this patent is extended or adjusted under 35 U.S.C. 154(b) by 565 days.

(21) Appl. No.: 11/413,306

(22) Filed: Apr. 28, 2006

(65) Prior Publication Data

US 2006/0244893 A1    Nov. 2, 2006

(30) Foreign Application Priority Data

Apr. 28, 2005  (JP)  .............................. 2005-133638

(51) Int. Cl.
*G02F 1/1345*  (2006.01)
(52) U.S. Cl. ........................ 349/149; 349/150; 349/151; 349/152
(58) Field of Classification Search .......... 349/149–152
See application file for complete search history.

(56) References Cited

U.S. PATENT DOCUMENTS

| | | | |
|---|---|---|---|
| 5,608,559 A * | 3/1997 | Inada et al. | 349/149 |
| 6,587,164 B2 * | 7/2003 | Onisawa et al. | 349/43 |
| 6,771,348 B2 | 8/2004 | Oh et al. | |
| 6,937,314 B2 * | 8/2005 | Kim | 349/149 |
| 6,985,193 B2 * | 1/2006 | Jang | 349/43 |

FOREIGN PATENT DOCUMENTS

| | | |
|---|---|---|
| CN | 1412614 A | 4/2003 |
| JP | 06-180460 | 6/1994 |
| KR | 2003-0032736 | 4/2003 |

* cited by examiner

*Primary Examiner*—Julie Ngo
(74) *Attorney, Agent, or Firm*—McCarter & English, LLP

(57) ABSTRACT

A portion of a protective layer located above a connection portion is removed to expose the connection portion which is formed of the same material as used for a data line DL in this removed portion. Then, a transparent conductive layer made of ITO is further formed on these films. The transparent conductive layer and a bump are then connected via an AFC.

10 Claims, 18 Drawing Sheets

DISPLAY APPARATUS AND MANUFACTURING METHOD OF DISPLAY APPARATUS

PRIORITY INFORMATION

The entire disclosure of Japanese Patent Application No. 2005-133638, filed on Apr. 28, 2005 is expressly incorporated by reference herein.

BACKGROUND OF THE INVENTION

1. Field of the Invention

The present invention relates to an active matrix display apparatus having a COG (Chip-On-Glass) terminal portion to which a separate semiconductor integrated circuit is directly connected in a peripheral portion, and a method of manufacturing the same.

2. Description of Related Art

Conventionally, as display apparatuses such as liquid crystal panels, active matrix display apparatus in which a thin film transistor for display control is disposed in each pixel have been widely used.

In such display apparatuses, an external data signal (video signal) or the like is received within a panel and is then supplied to each pixel. In order to achieve this, data lines are provided in the vertical direction and selection (gate) lines are provided in the horizontal direction, and, with a data signal being supplied to a data line, an associated pixel is selected by the corresponding gate line, thereby controlling supply of the data signal to each pixel. Thus, this structure requires control of data supply to the data line and selection of the gate line, which therefore requires a vertical driver and a horizontal driver in these display apparatuses.

These vertical and horizontal drivers are often provided within the display panel. Here, comparatively high speed processing is required for the horizontal driver, which must control the operation of supplying a data signal to a data line in each column within one horizontal period. Accordingly, in many cases, the horizontal driver is provided within a separate semiconductor integrated circuit (a horizontal driver IC) from which a data signal is supplied directly to each data line. In this case, it is preferable to adopt a COG (Chip On Glass) structure in which each data line is extended to the peripheral portion of the panel where a terminal of the horizontal driver IC is connected via an ACF (anisotropic conductive film)

An example structure which adopts the above-described COG structure is shown in FIG. 18. A connection portion 10 connected to a data line DL is covered with a protective film 12 which is an insulating film. A portion of this protective film 12 is then removed to form a contact hole, and a transparent conductive film 14 including this contact hole is formed. Consequently, the transparent conductive film 14 contacts the connection portion 10 in the portion where the protective film is removed. Further, a portion of the transparent conductive film 14 located above the protective film 12 is used as a terminal portion of the COG structure. Here, the terminal portion of the COG structure is formed on a TFT substrate 16 on which a thin film transistor (TFT) of each pixel as described above is formed.

Here, the protective film 12 is a planarization film which covers the thin film transistor provided in each pixel. Further, in each pixel, a transparent conductor, such as a pixel electrode formed of IZO, for example, is formed on the planarization film. Therefore, the transparent conductive film 14 is formed in the same process as a process in which the pixel electrode is formed.

As described above, the planarization film and the transparent conductive film 14 which are formed in the pixel area can be used for forming the terminal portion of the COG structure without performing any additional process. Further, use of the transparent conductive film in the terminal portion is disclosed in Japanese Patent Laid-Open Publication No. Hei 06-180460, for example.

The above structure, however, suffers from a problem that sufficient connection cannot be achieved by application of pressure onto the ACF in the terminal portion described above because the planarization film is relatively soft.

SUMMARY OF THE INVENTION

According to the present invention, in the terminal portion, a transparent conductive layer which is formed on a connection portion formed of a conductor including a layer of aluminum or an aluminum alloy (preferably, Al—Nd) is used. Accordingly, in connection utilizing the COG structure, the terminal portion can have sufficient rigidity. Further, because the connection portion formed by aluminum or aluminum alloy is covered with the transparent conductive layer, contact resistance can be reduced in the terminal portion while prohibiting formation of an oxide film, thus achieving an effective connection.

BRIEF DESCRIPTION OF THE DRAWINGS

A preferred embodiment of the present invention will be described in detail based on the following figures, wherein.

DETAILED DESCRIPTION OF PREFERRED EMBODIMENT

A preferred embodiment of the present invention will be described in detail with reference to the accompanying drawings.

Figure 1A:
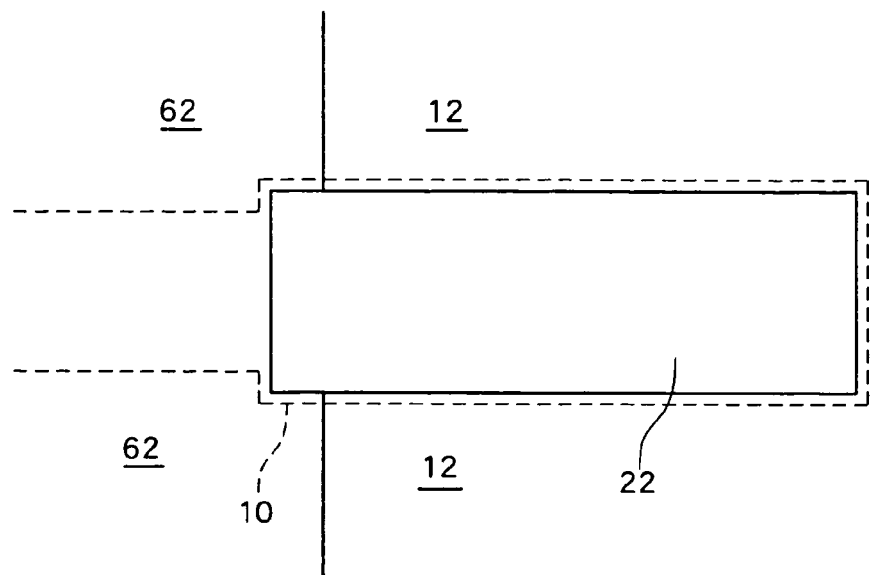
FIGS. 1A and 1B are views showing a structure of a terminal portion according to an embodiment.
Figure 1B:
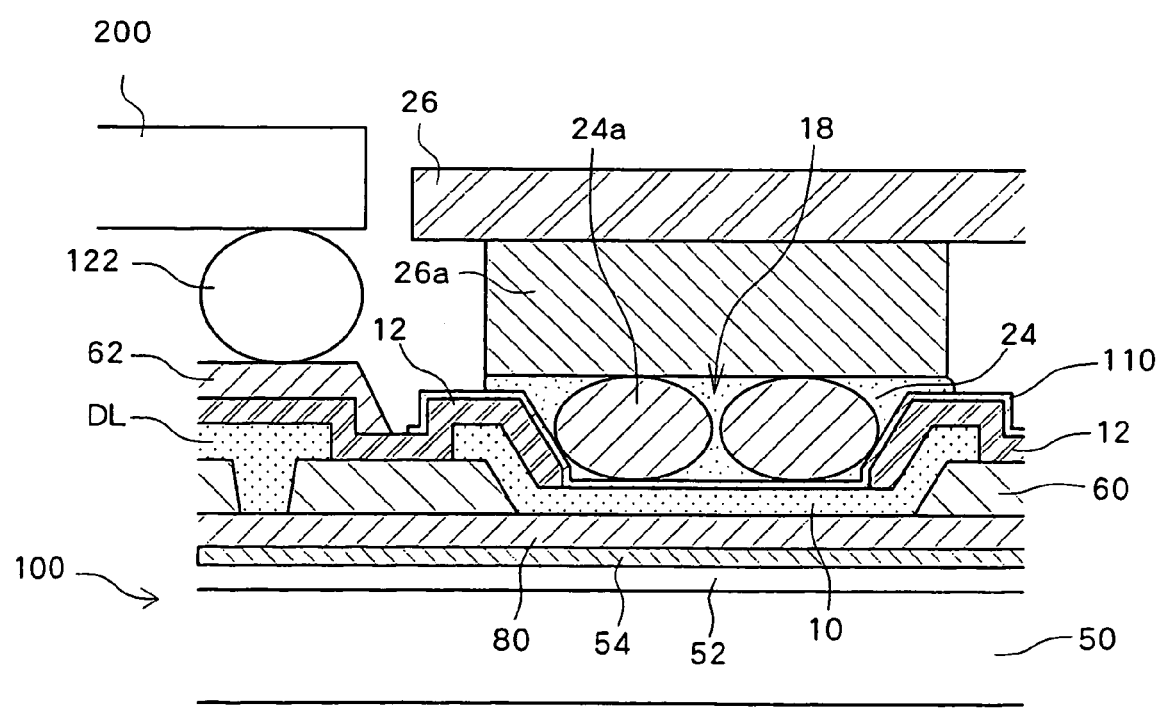

FIGS. 1A and 1B are views showing a structure of the COG terminal portion according to an embodiment.

A data line DL, which is formed on an interlayer insulating film 60, extends to the peripheral portion and terminates before a COG terminal portion. A contact hole is formed in the interlayer insulating film 60 at the terminal end portion of the data line DL, so that the data line DL contacts a molybdenum line 80 formed below. Further, the molybdenum line 80 extends into the COG terminal portion, where a connection portion 10 is formed on the molybdenum line 80. Here, the molybdenum line 80 is formed in the same process as that of a gate electrode (a gate line) which will be described below.

A protective film 12 is formed on the connection portion 10, the data line DL, and a portion of the interlayer insulating film 60 located between the connection portion 10 and the data line DL.

Here, the interlayer insulating film 60 is a layered film of $SiO_2$/SiNx, and the data line DL, as well as the connection portion 10, is a conductor having a three-layer structure formed of Molybdenum (Mo), aluminum neodymium (Al/Nd), and Molybdenum (Mo). It is also preferable that the data line DL and the connection portion 10 are formed of a conductor having a three-layer structure of titanium (Ti), aluminum (Al), and titanium (Ti). Further, the data line DL and the connection portion 10 may have a single layer structure, a two-layer structure, or a layered structure including four or more layers, or a structure using metals other than those described above. In addition, the protective film 12 is formed by a silicon nitride film represented by SiNx.

A portion of this protective film 12 is removed to form a removed portion 18 where the connection portion 10 is exposed. Further, a transparent conductive layer 110 is formed to cover the connection portion 10 in this removed portion 18. In the shown example, the transparent conductive layer 110 is made of ITO and is also formed covering the protective film 12 in the periphery of the removed portion 18. In other words, the transparent conductive layer 110 is formed slightly larger than the connection portion 10.

Here, the removed portion 18 is formed in a relatively large area. In other words, the bottom portion of the COG terminal portion 22 which is formed by the transparent conductive layer 110 within the removed portion 18 has a certain area. Therefore, an ACF (anisotropic conductive film) 24 is disposed on the bottom portion of the transparent conductive layer 110 in the COG terminal portion 22 which corresponds to the bottom portion of the removed portion 18 and is pressed by a bump 26a provided on the lower surface of a horizontal driver IC 26. The ACF 24 is formed by containing conductive particles (metal-coated plastic balls or the like) 24a in a thermosetting resin, for example. In the portion of the ACF 24 which is pressed, the conductive particles 24a directly contact the bump 26a and the transparent conductive layer 110, or the conductive particles 24a contact with each other, thereby connecting the bump 26a with the transparent conductive layer 110. As a portion of the ACF 24 which is not pressed presents no conductivity, it is possible to dispose the ACF 24 so as to cover the overall region of the connection portion (a plurality of COG terminal portions corresponding to a plurality of terminals (bumps) of the horizontal driver IC) and then achieve electrical connection only in the portion of the ACF 24 which is pressed by the bump 26a. Here, gold or the like is used as the bump 26a. Further, while in FIG. 1, only one step of the ACF 24 is used in the thickness direction, two or more steps of the ACF 24 may be layered. In such a case, the conductive particles 24a contact with each other, thereby achieving electrical connection between the bump 26a and the transparent conductive layer 110 in the removed portion 18.

Further, the connection portion 10, which is connected to the data line DL in the above example, may be connected with another line such as a power source line, as long as the line is used for COG connection with a separate semiconductor integrated circuit. Also, a switch may be provided in the middle of the data line DL for switching a data signal ON and OFF.

In addition, a planarization film 62 is formed on the protective film 12 in the portion other than the peripheral portion, and therefore the planarization film 62 exists on the portion of the protective film 12 covering the data line DL.

Figure 2:
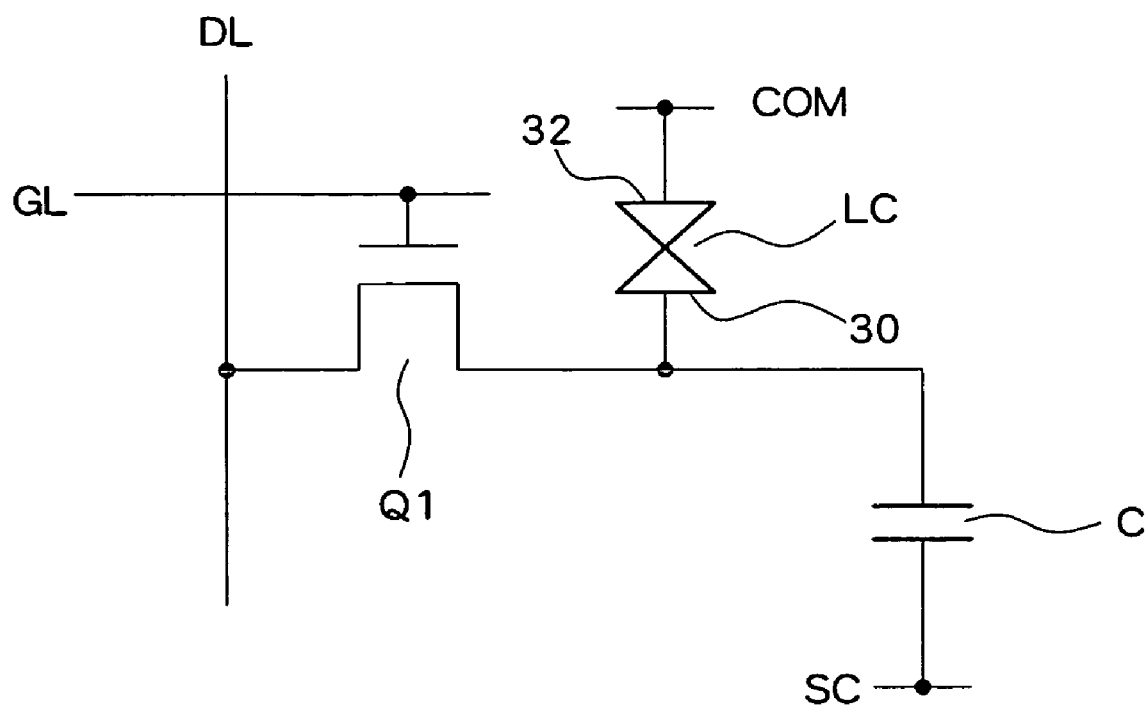
FIG. 2 is a view showing a pixel circuit.

FIG. 2 shows a structure of a pixel circuit. The data line DL extends in the column (vertical) direction of the liquid crystal panel such that one data line is provided in each column. The gate line GL extends in the row (horizontal) direction of the liquid crystal panel such that one gate line is provided in each row. Further, each SC line is provided in each row in the row direction.

A drain of a selection transistor Q1 which is an n-channel TFT is connected to the data line DL. A source of the selection transistor Q1 is connected to one electrode of a pixel electrode 30 and one electrode of a storage capacitor C. The other electrode of the storage capacitor is connected with the SC line SC. Further, a common electrode 32 covering all the pixels is provided so as to oppose the pixel electrode 30, and liquid crystal LC is disposed between the pixel electrode 30 and the common electrode 32.

A plurality of gate lines GL are sequentially selected for each one horizontal period and are set at H level. Consequently, the selection transistor Q1 whose gate is connected to the selected gate line in the corresponding row is turned ON. To the data line DL, on the other hand, a data voltage concerning the pixel in the row where the selection transistor Q1 is turned ON is supplied. Accordingly, the storage capacitor C of each pixel in the selected row is charged with the data voltage of the corresponding pixel. Thus, the data voltage stored in the storage capacitor C is applied to the liquid crystal LC of the corresponding pixel, for achieving display. While the gate lines are sequentially selected, display of one pixel due to the data voltage which is written continues until writing of data is performed in the next frame.

Figure 3:
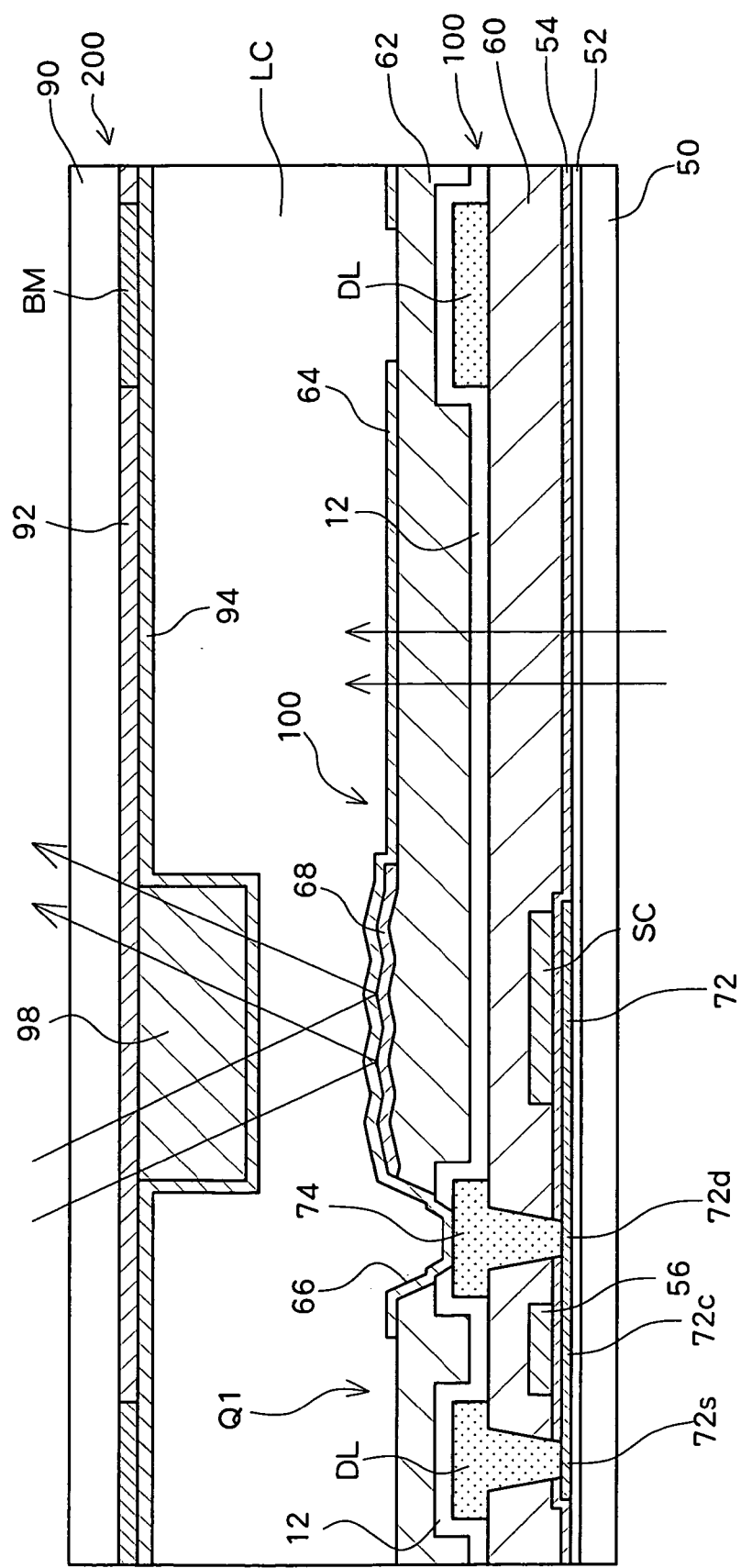
FIG. 3 is a cross sectional view showing a structure of a pixel portion.
Figure 4:
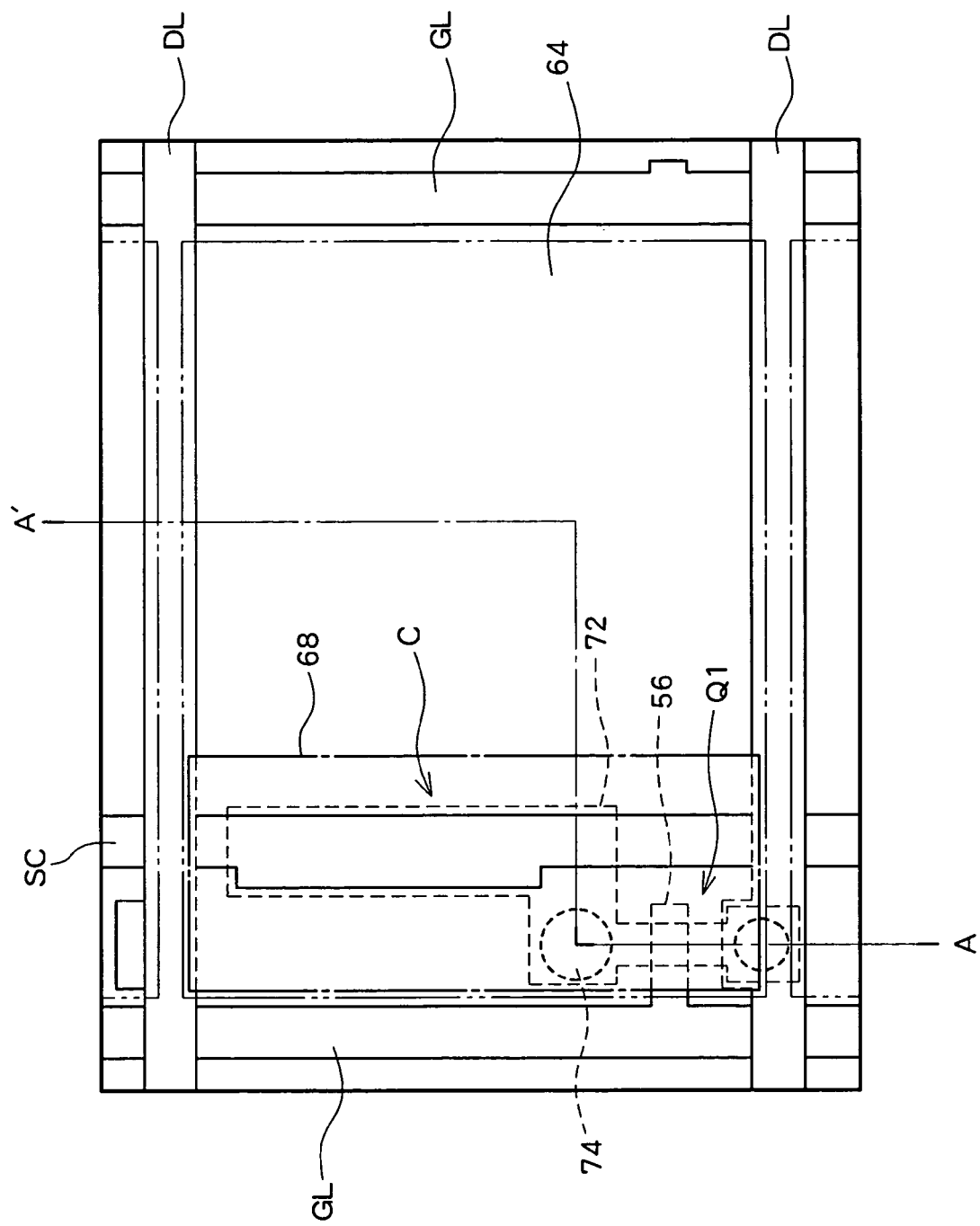
FIG. 4 is a plan view showing a structure of a pixel portion.
Figure 5:
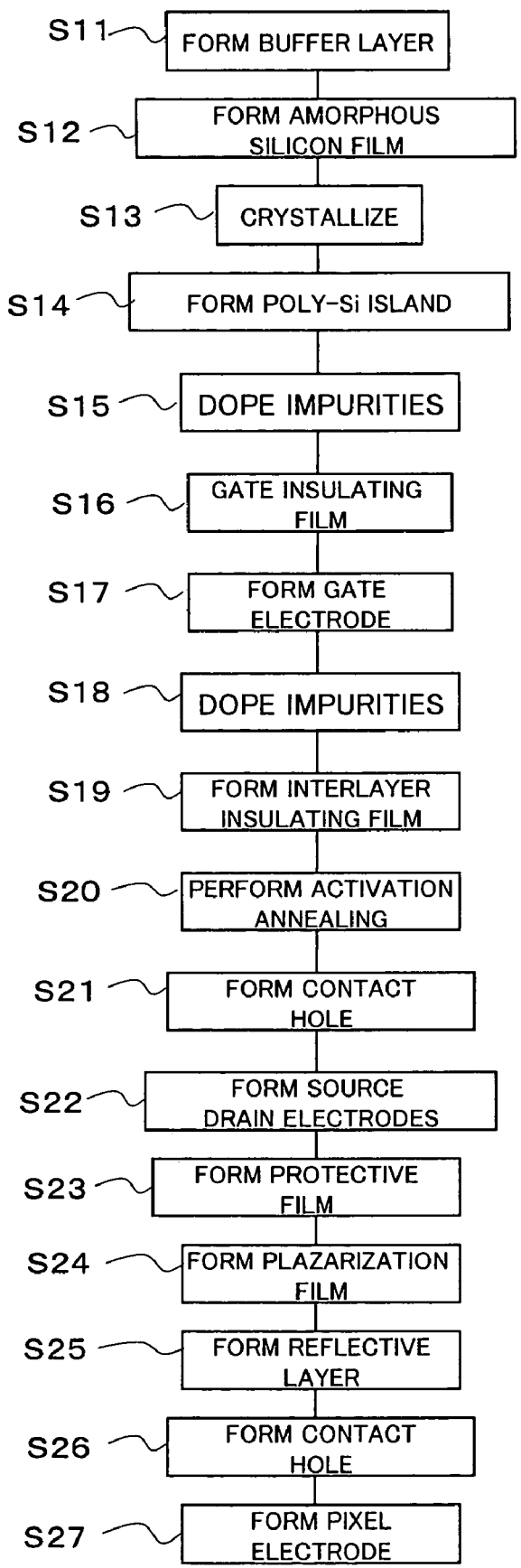
FIG. 5 is a flowchart showing a process procedure.

FIGS. 3 and 4 show the structure of the pixel portion in a cross sectional view and a plan view, respectively. On the glass substrate 50, a buffer layer 52 formed of a two-layer structure of $SiO_2$/SiNx is disposed. A semiconductor layer 72 is formed on a predetermined portion of the buffer layer 52. In this example, the semiconductor layer 72 is formed of polysilicon. On the semiconductor layer 72 and the buffer layer 52, a gate insulating film 54 formed of a two-layer structure of SiNx/$SiO_2$ is formed. Further, a gate electrode 56 is formed on the gate insulating film 54 in a portion above the center portion of the semiconductor layer 72. While a single gate electrode 56 is formed in the shown example which adopts, as the selection transistor Q1, a single gate type TFT, it is preferable to form two gate electrodes 56. Here, in this example, the gate electrode 56 is formed by projecting a predetermined portion of the gate line GL in the horizontal direction. The portion of the semiconductor layer 72 under the gate electrode 56 corresponds to a channel region 72c, and a drain region 72d and a source region 72s are formed on both sides of the channel region 72c, thereby forming the selection transistor Q1.

The interlayer insulating film 60 formed of a layered film of $SiO_2$/SiNx is disposed on the gate electrode 56 and the gate insulating film 54. A drain (or source) electrode 74 is formed on the interlayer insulating film 60 at a position above the drain (or source) region 72d. This drain electrode 74 is directly connected with the drain region 72d due to a contact through the interlayer insulating film 60 and the gate insulating film 54. Further, the source region 72s is connected with the data line DL via a contact, and the data line DL functions as a source electrode.

The semiconductor layer 72 further extends from the drain region 72d in the horizontal direction, and in this extended portion the SC line SC is opposed to the semiconductor layer 72 via the gate insulating film 54. Accordingly, the extended portion of the semiconductor layer 72, the SC line SC, and the gate insulating film 54 sandwiched therebetween form the storage capacitor C.

The protective film 12 made of SiNx (silicon nitride) and the planarization film 62 made of an acrylic resin are formed covering the drain electrode 74, the interlayer insulating film 60, and the data line DL. Further, a contact hole is formed through the protective film 12 and the planarization film 62 located above the drain electrode 74, and the pixel electrode 64 made of ITO is formed using this contact.

In the shown example, which is a transflective panel, a reflective film 68 is provided on the planarization film 62 in a region under the pixel electrode 64. Here, a space in which this reflective film 68 is provided is approximately one third of the pixel region. In the case of a reflective panel, however, the reflective film 68 is provided over the entire surface under the pixel electrode 64.

A portion of the planarization film 62 in which the reflective film 68 is provided is formed to have an uneven surface so as to increase the reflection angle of light reflected by the reflective film 68.

The TFT substrate 100 is configured as described above. Further, an opposing substrate 200 is disposed so as to oppose this TFT substrate 100 with the liquid crystal LC interposed therebetween.

The opposing substrate 200 includes a glass substrate 90, and a color filter 92 having black matrix (BM) at the boundary portion of a pixel is disposed on (the inner side of) this glass substrate 90. The color filter 92 having any one of the three colors of RGB is adopted for each pixel.

On (the inner side of) the color filter 92, an opposing electrode 94 is formed as a common electrode for all the pixels. As with the pixel electrode 64, the opposing electrode 94 is also made of ITO. Further, in a portion of the opposing electrode 94 which is opposed to the reflective film 68, a thickness adjustment layer 98 is provided between the color filter 92 and the opposing electrode 94 such that the thickness of the liquid crystal LC is halved in this portion so as to equalize the light path length. Further, while the thickness adjustment layer 98 can be used as an orientation control projection in the case of a VA (vertical alignment) type liquid crystal, a separate orientation control projection may be formed at a predetermined position on the opposing electrode 94 in each pixel so as to achieve orientation control.

Further, a polarizing film and a retardation film are provided on the outer side of each of the glass substrate 50 and 90, and an alignment film is provided between the liquid crystal LC and each of the pixel electrode 64 and the opposing electrode 94.

With the above structure, when the TFT including the semiconductor layer 72 (the selection transistor Q1) is turned ON, the data voltage from the data line DL is applied to the pixel electrode 64. Consequently, this data voltage is supplied to the liquid crystal LC disposed in a space between the pixel electrode 64 and the opposing electrode 94, so that display in accordance with the data voltage is performed.

Here, as shown in FIG. 4, the reflective film 68 is formed covering the region above the selection transistor Q1 and the storage capacitor C, and this portion therefore functions as a reflective LCD. Accordingly, it is possible to use the overall pixel region as a liquid crystal display portion.

The manufacturing process will be described with reference to FIGS. 5 to 15B. The TFT forming process will be performed first.

In the TFT forming process, the buffer layer 52 is formed over the entire region of the glass substrate 50 (S11), and an amorphous silicon (a-Si) film is then formed on the buffer layer (S12). Here, the buffer layer 52 is a layered film of $SiO_2$/SiNx having a thickness of 100 to 200 nm, and the a-Si film has a thickness of approximately 30 to 50 nm. These films are formed by plasma CVD. In this manner, on the glass substrate 50, a layered structure of a-Si/$SiO_2$/SiNx/glass (glass substrate) is formed.

Then, laser irradiation (laser annealing) is applied to the amorphous silicon film so as to perform crystallization at a low temperature (S13). Consequently, the amorphous silicon is crystallized to thereby form a poly-silicon layer. The resulting poly-silicon layer is then patterned such that a poly-silicon island (the semiconductor layer 72) is formed at a required portion (S14). Subsequently, resist patterns are formed by photolithography, and impurities (e.g. phosphorus) are doped in the source and drain regions of an n-channel TFT using the resist patterns (S15).

Then, the gate insulating film 54 formed of a layered film of SiNx/$SiO_2$ is formed over the entire region of the substrate including the semiconductor layer 72 (S16).

Figure 7A:
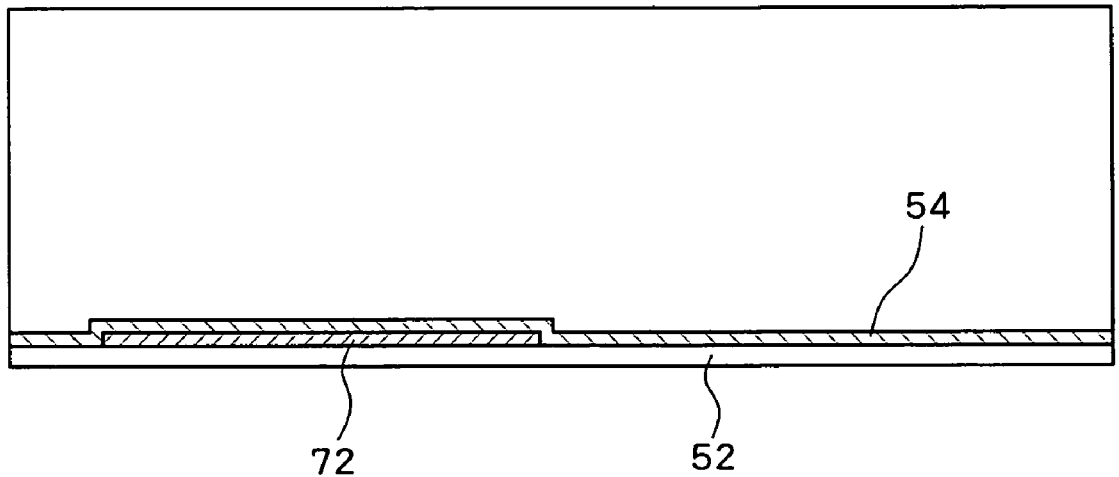
FIGS. 7A and 7B are cross sectional views of the pixel portion and the COG terminal portion, respectively, for showing the process procedure.
Figure 7B:
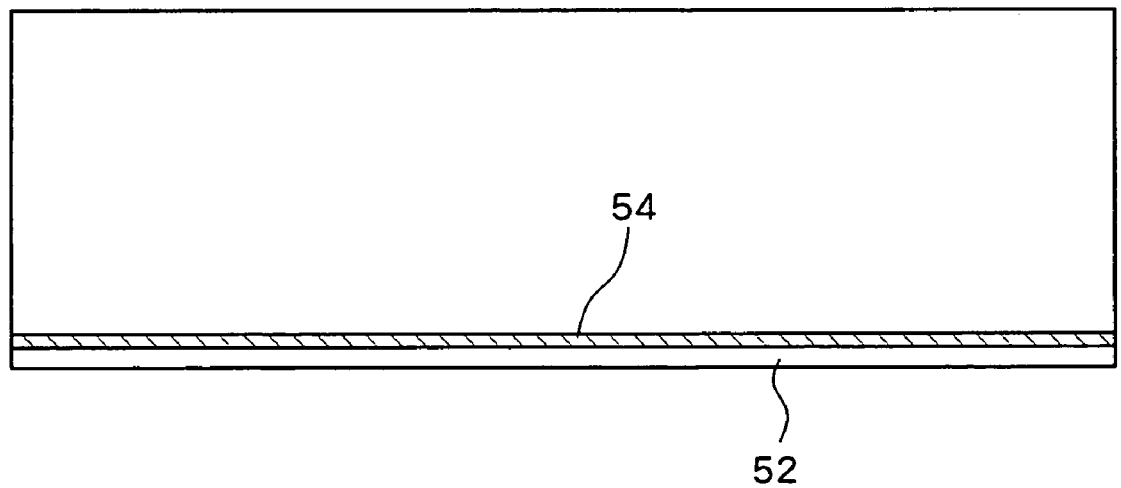

With the above process, in the pixel portion, the gate insulating film 54 is formed covering the semiconductor layer 72 made of poly-silicon which is formed in the region where a TFT and a capacitor are to be formed or the like, as shown in FIG. 7A. In the COG terminal portion, on the other hand, the gate insulating film 54 is formed over the buffer layer 52, as shown in FIG. 7B.

Figure 8A:
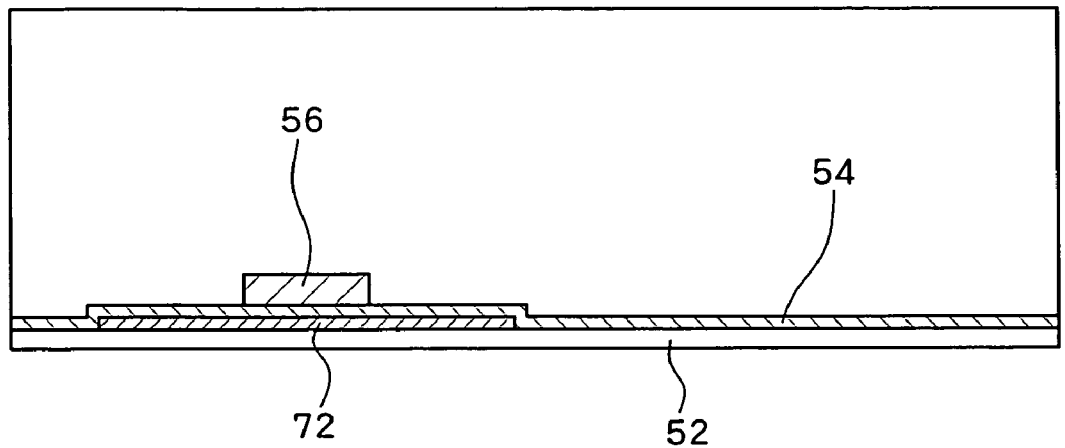
FIGS. 8A and 8B are cross sectional views of the pixel portion and the COG terminal portion, respectively, for showing the process procedure.
Figure 8B:
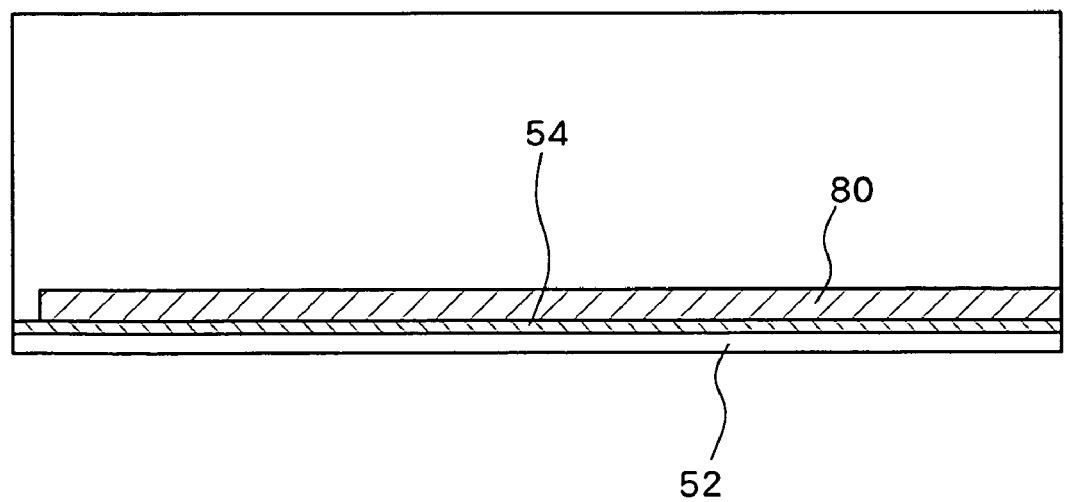

Then, as shown in FIG. 8A, the gate electrode 56 is formed by sputtering on the gate insulating film 54 at a location above the channel region 72c of the semiconductor layer 72 (S17). Here, the gate electrode 56 is made of molybdenum (Mo) as described above, and is formed at a thickness of 200 to 300 nm. Further, the gate electrode 56 is formed as a portion of the gate line GL. In addition, the SC line SC is also formed in the same process as that of the gate line GL, and the storage capacitor C is formed by disposing the semiconductor layer 72, which is formed for the storage capacitor, so as to oppose the SC line SC with the gate insulating film 54 interposed therebetween. Also, in the process of forming the gate electrode 56 in the pixel portion, the molybdenum line 80 is formed in the same process in the COG terminal portion, as shown in FIG. 8B.

After formation of the gate line GL or the like as described above, impurities (e.g. boron) are doped into the source and drain regions of the p-channel TFT in the peripheral circuit (S18). This process is performed by ion doping of boron using a resist which is formed by photolithography in the region other than the region in which ion doping is necessary. At this time, no process is applied in the COG portion (no impurity doping is performed, either).

Then, the interlayer insulating film 60 formed of SiO$_2$/SiNx is formed over the entire region of the substrate using plasma DVD (S19). The thickness of the interlayer insulating film 60 is approximately 400 to 700 nm. When the interlayer insulating film 60 is formed, the regions in which impurities are doped are activated due to activation annealing by means of a heat treatment (S20) to thereby achieve sufficient mobility of carriers in these regions.

Figure 9A:
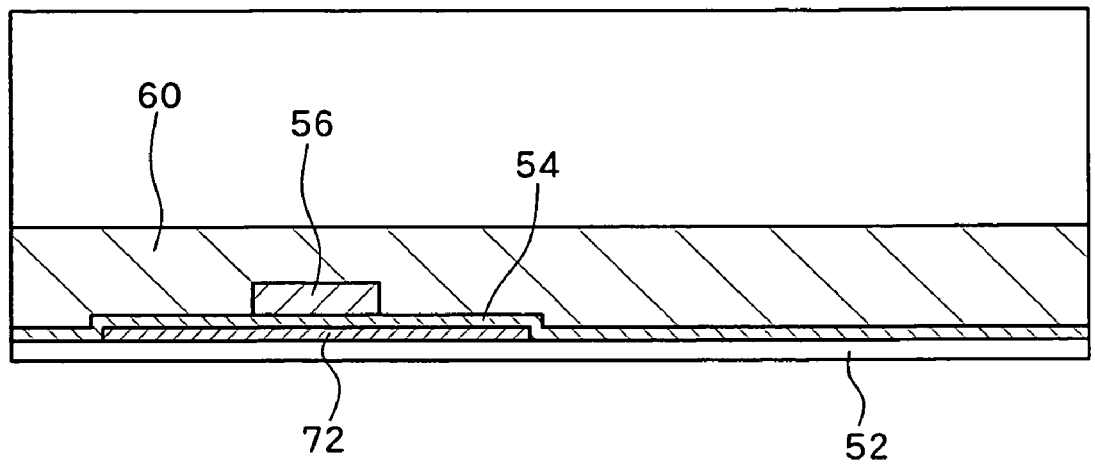
FIGS. 9A and 9B are cross sectional views of the pixel portion and the COG terminal portion, respectively, for showing the process procedure.
Figure 9B:
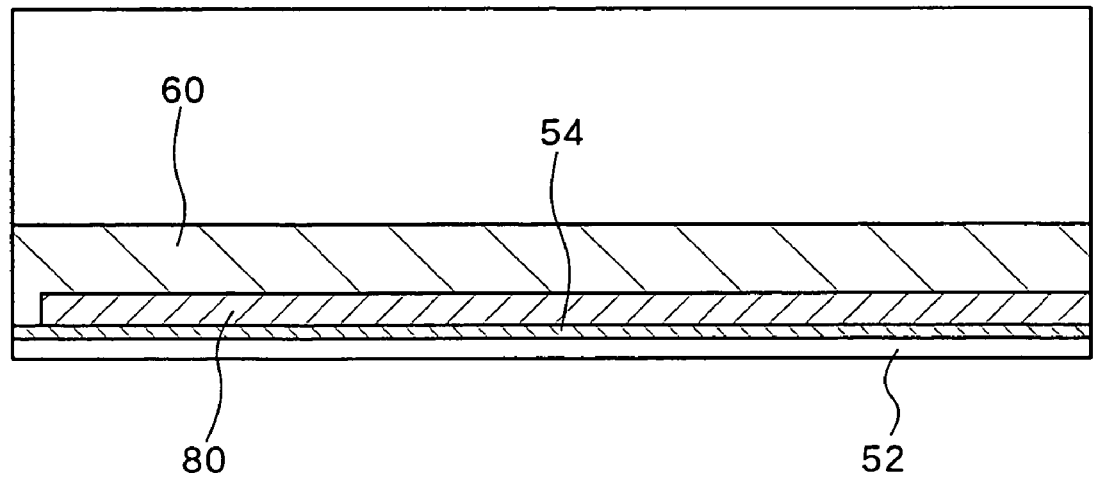
Figure 10A:
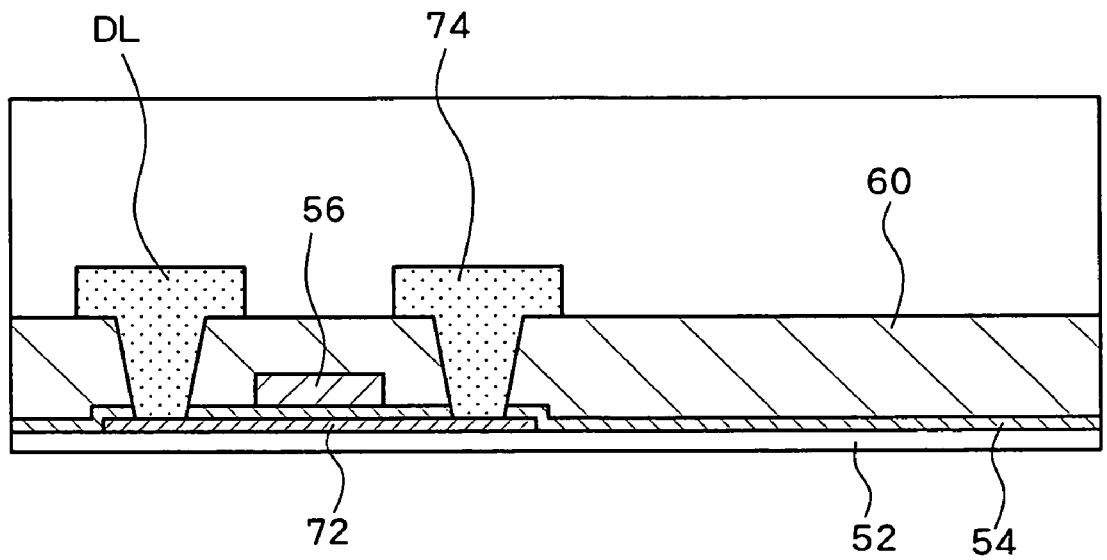
FIGS. 10A and 10B are cross sectional views of the pixel portion and the COG terminal portion, respectively, for showing the process procedure.
Figure 10B:
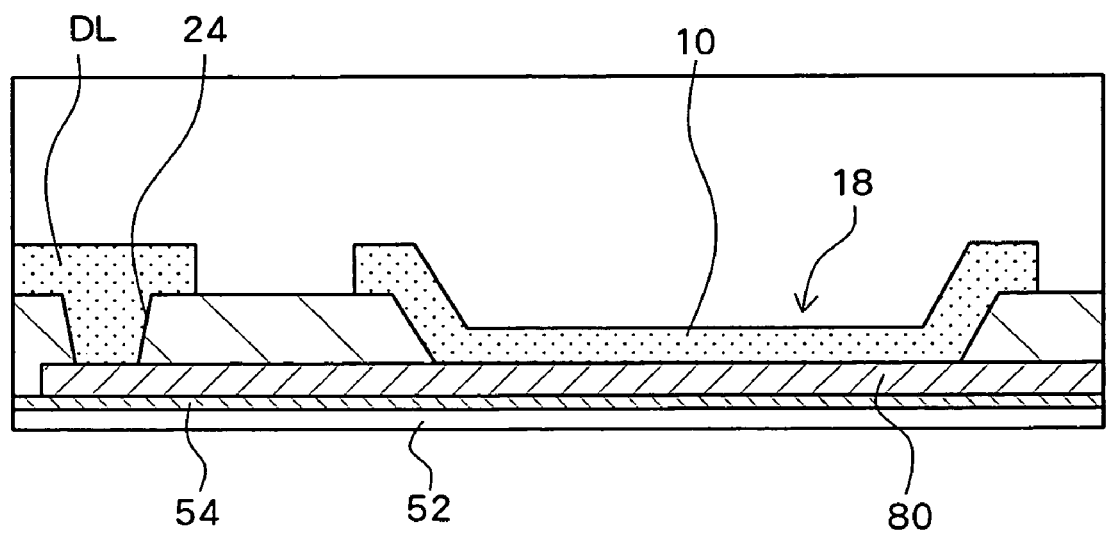

With this process, the interlayer insulating film 60 is formed in the pixel portion and also in the COG terminal portion, as shown in FIGS. 9A and 9B. Here, as the impurities are not doped in the COG portion, the activation process is not performed in the COG portion.

Further, through the regions in the interlayer insulating film 60 and the gate insulating film 54 corresponding to the source and drain regions of the semiconductor layer 72, contact holes are formed by photolithography and wet etching (S21). At this time, in the COG terminal portion, a contact hole is formed on the interlayer insulating film 60 above the molybdenum line 80 the inner end portion of the molybdenum line 80, while the removed portion 18 is also formed in the terminal portion. Subsequently, the data line DL (source electrode) and the drain electrode 74 are formed (S22). Here, the data line DL and the drain electrode 74 are formed so as to cover the contact holes. The data line DL in each column extends into the peripheral portion such that the end portion of the data line DL reaches over the contact hole. Accordingly, the data line DL is connected with the molybdenum line 80 via this contact. In addition, the connection portion 10 is formed together with the data line DL or the like so as to cover the removed portion 18 in the COG terminal portion.

As such, with the above process, the source (data line DL) and the drain electrode are formed in the pixel portion, while in the COG terminal portion, the data line DL is connected with the molybdenum line 80 via the contact which is formed through the interlayer insulating film 60, and the connection portion 10 is formed on the molybdenum line 80 in the removed portion 18. These films are formed by forming a layered film of Mo/Al—Nd/Mo (at a thickness of 400 to 800 nm) by sputtering and then applying photolithography and wet etching to the layered film.

Figure 6:
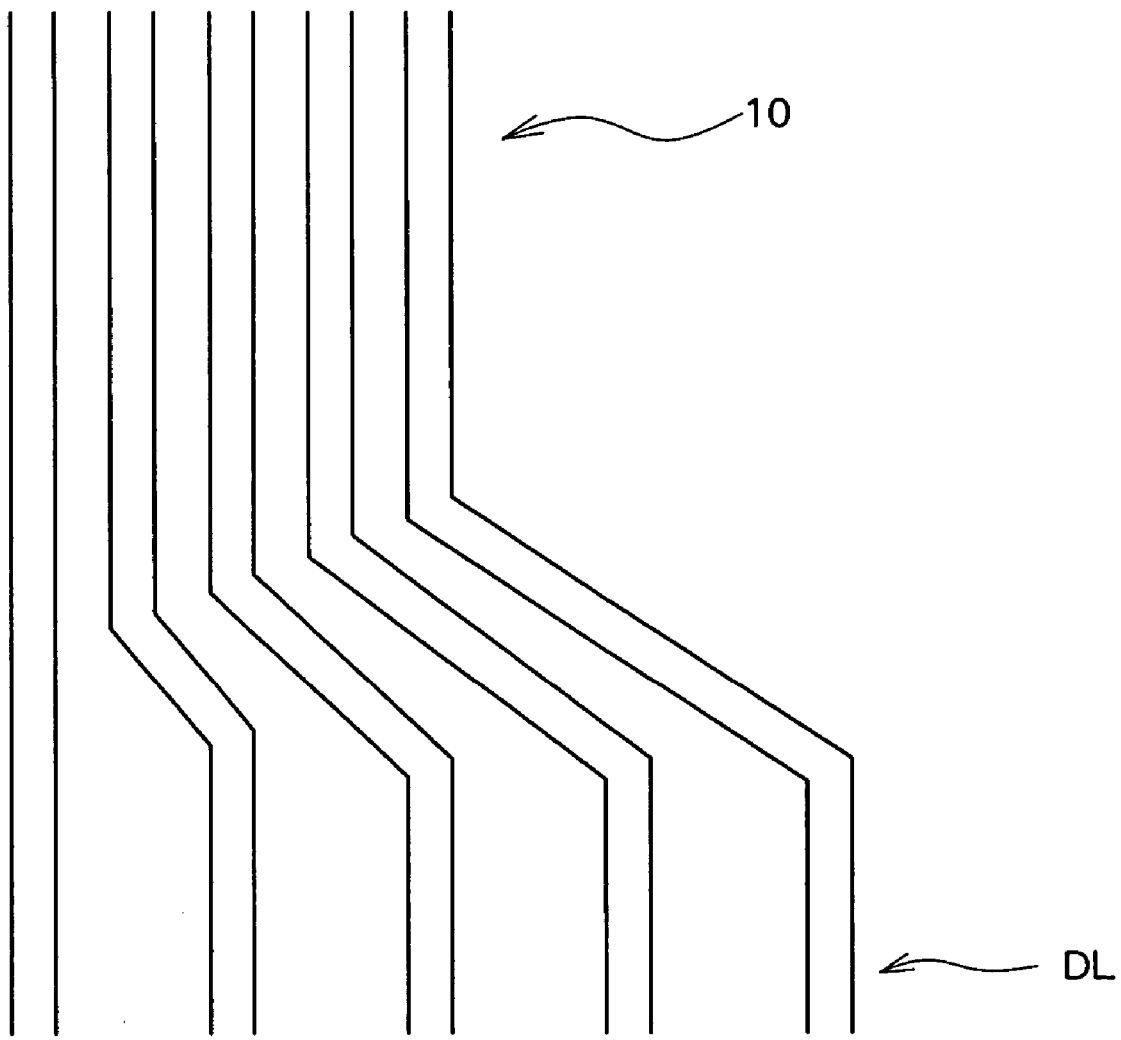
FIG. 6 is a view showing a relationship between the data lines and the connection portions.

Here, while the data lines DL spread over the entire region in the width (horizontal) direction of the display portion, the connection portions 10, which are connected with the horizontal driver IC via the transparent conductive layer 110, are disposed at smaller intervals than those of the data lines DL, as partially shown in a schematic manner in FIG. 6. Further, the TFT substrate 100 shown in FIG. 1 is formed by the glass substrate 50, the buffer layer 52, and the gate insulating film 54.

Figure 11A:
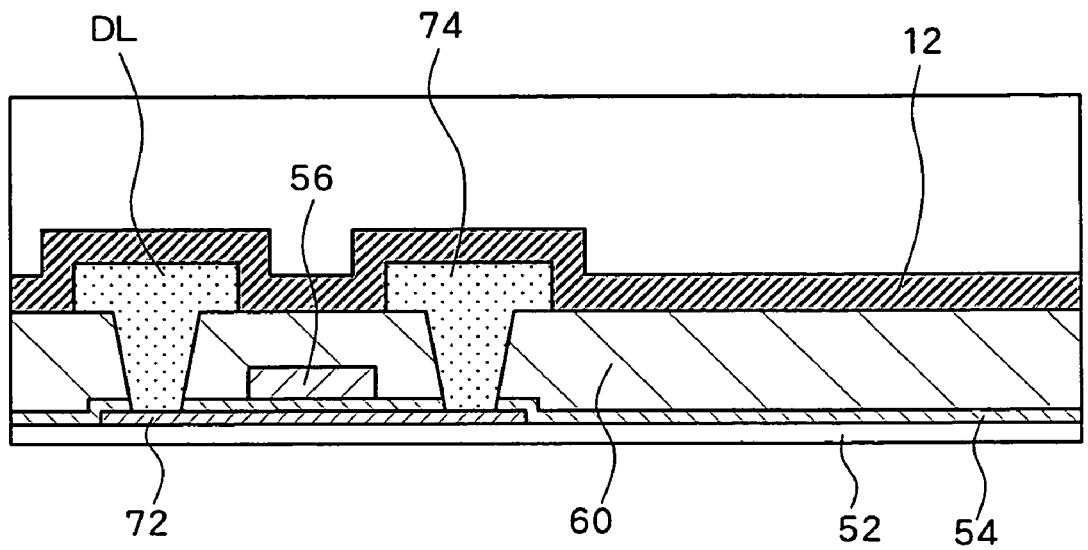
FIGS. 11A and 11B are cross sectional views of the pixel portion and the COG terminal portion, respectively, for showing the process procedure.
Figure 11B:
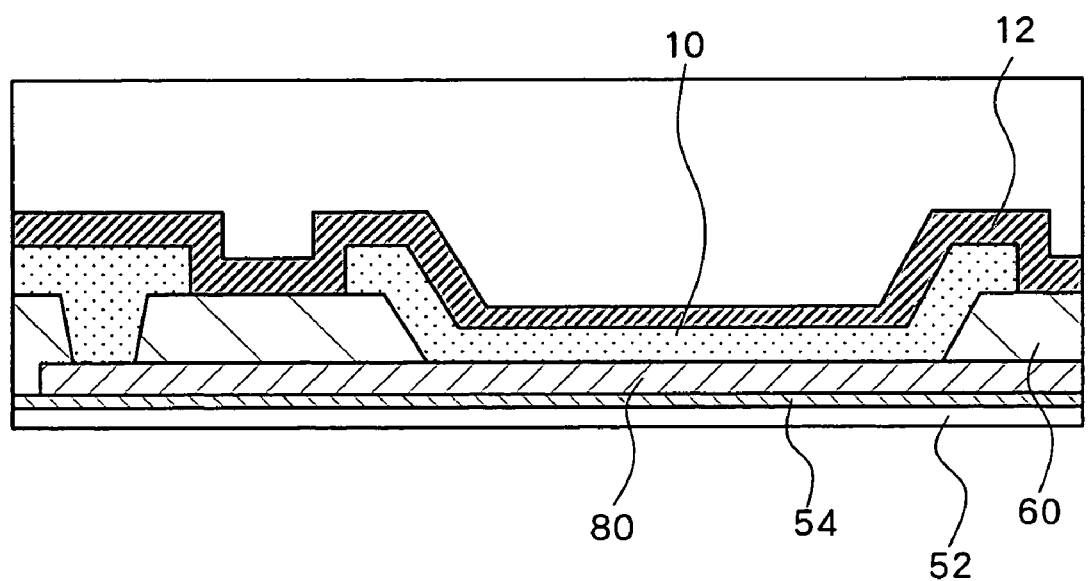

Then, the protective film 12 made of SiNx is formed over the entire region of the substrate (S23). Consequently, the entire surface is covered with the protective film 12, as shown in FIGS. 11A and 11B.

Figure 12A:
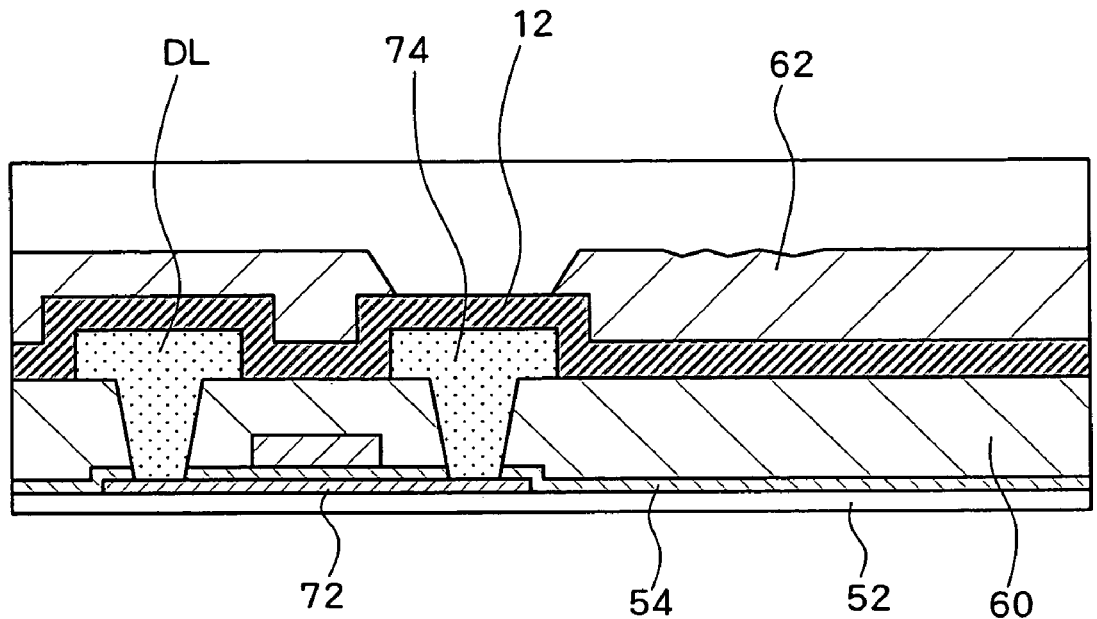
FIGS. 12A and 12B are cross sectional views of the pixel portion and the COG terminal portion, respectively, for showing the process procedure.
Figure 12B:
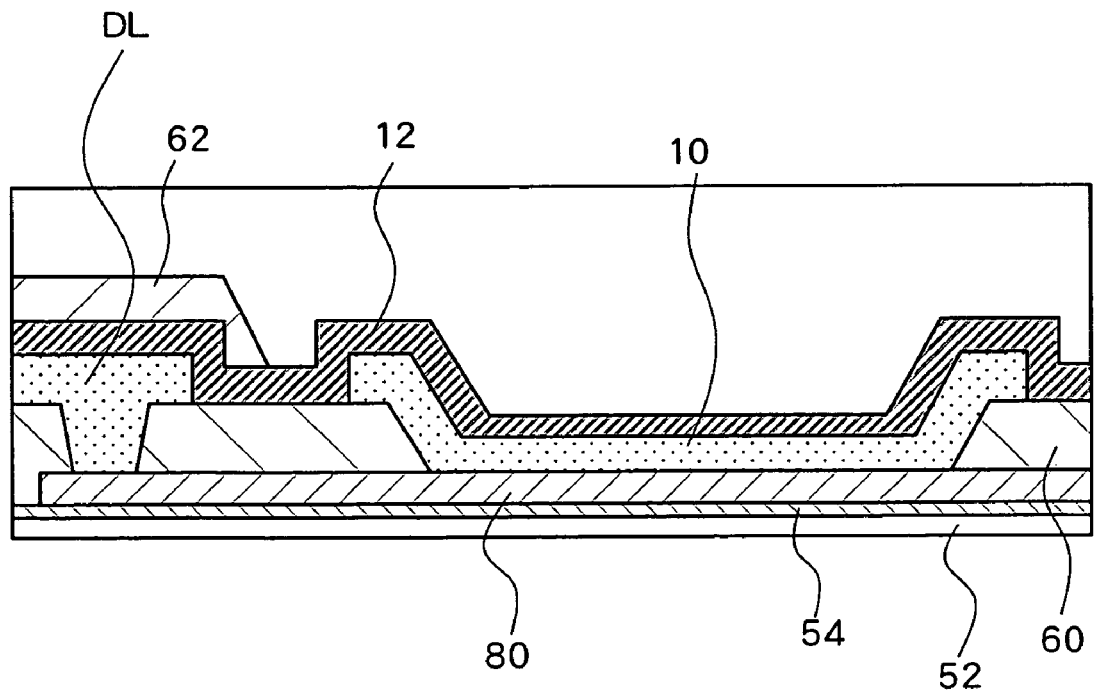

Further, the planarization film 62 made of an acrylic resin is formed over the entire region of the substrate (S24) and a predetermined portion of the planarization film 62 is then removed. Specifically, the portion of the planarization film 62 above the drain electrode 74 is removed in each pixel. In addition, in the COG terminal portion, the portion of the planarization film 62 located outside the terminal end of the data line DL is removed to thereby expose the protective film 12. More specifically, as shown in FIGS. 12A and 12B, at the time of forming a contact hole in the planarization film 62 in the pixel portion, the planarization film 62 above the connection portion 10 is removed. Further, at the time of forming the contact hole, an uneven portion is formed by using non-uniform exposure in the region of the planarization film 62 where the reflective film 68 is to be formed.

Figure 13A:
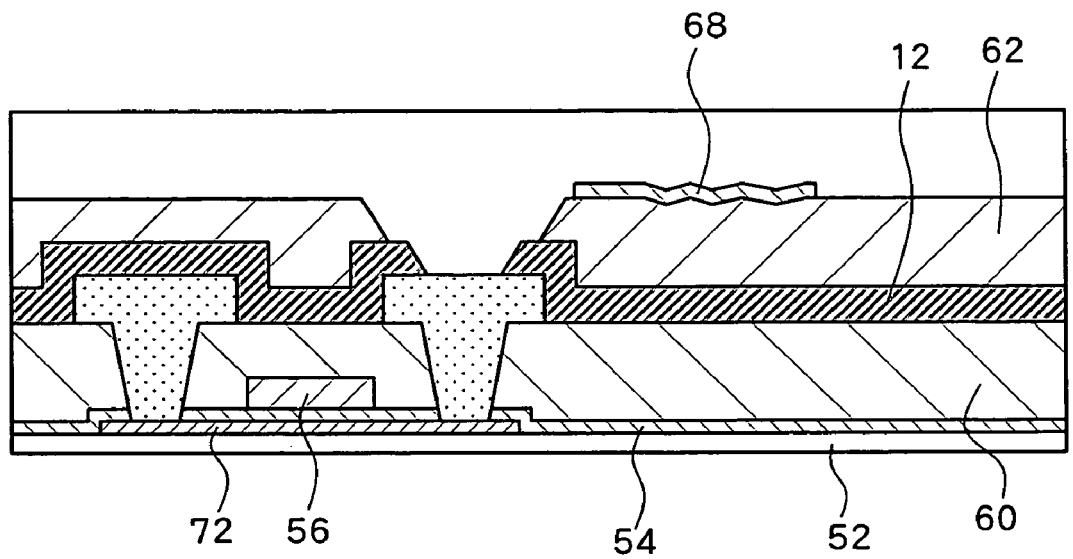
FIGS. 13A and 13B are cross sectional views of the pixel portion and the COG terminal portion, respectively, for showing the process procedure.
Figure 13B:
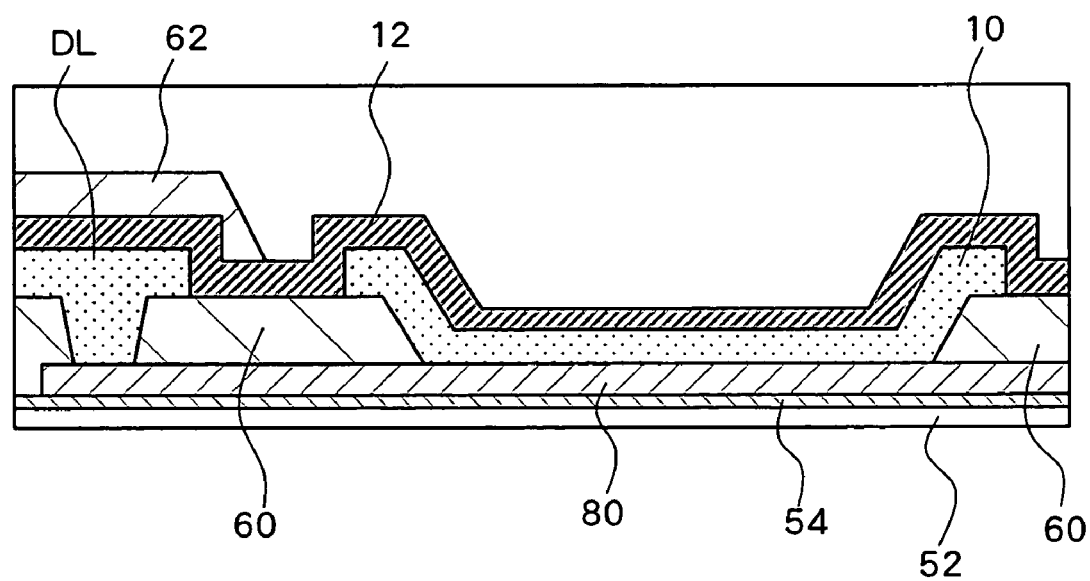

Further, as shown in FIG. 13A, the reflective film 68 made of Al—Nd is formed on the planarization film 62 by sputtering and then photolithography and wet etching (S25). At this time, no film is formed in the COG terminal portion, as shown in FIG. 13B.

Figure 14A:
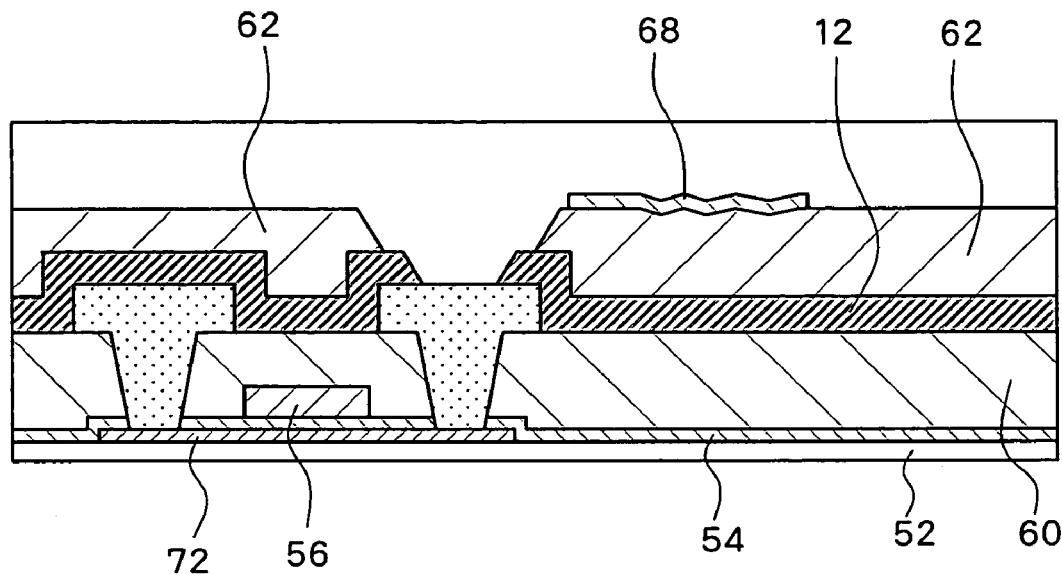
FIGS. 14A and 14B are cross sectional views of the pixel portion and the COG terminal portion, respectively, for showing the process procedure.
Figure 14B:
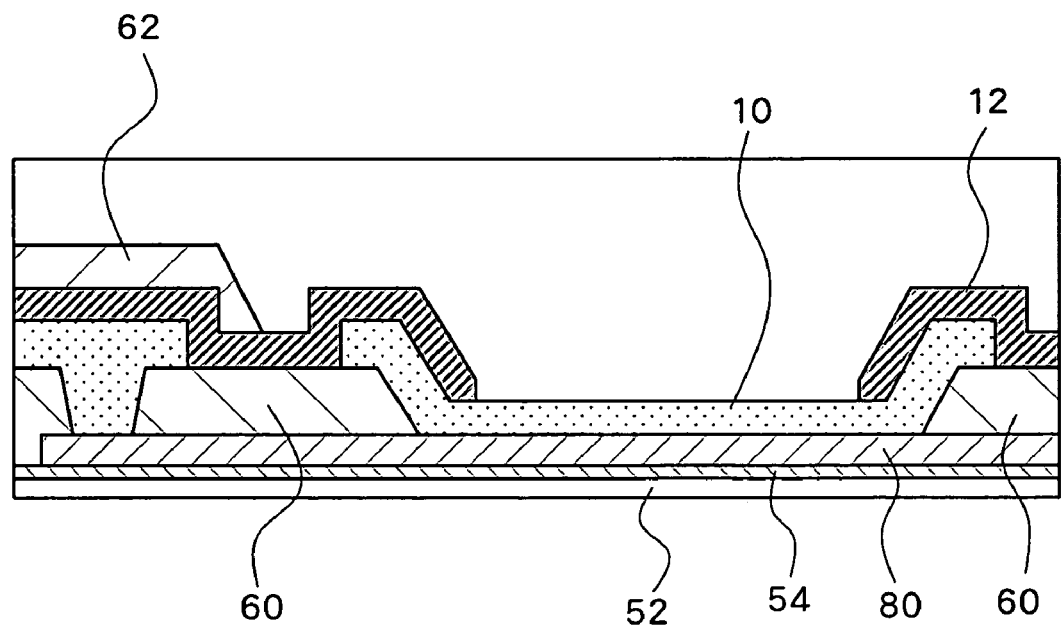

Then, the protective film 12 located above the drain electrode 74 and the protective film 12 located on the removed portion 18 in the COG terminal portion are removed by photolithography and wet etching to thereby form contact holes (S26). With this process, the upper surface of the drain electrode 74 and the connection portion 10 in the removed portion 18 are exposed as shown in FIGS. 14A and 14B.

Figure 15A:
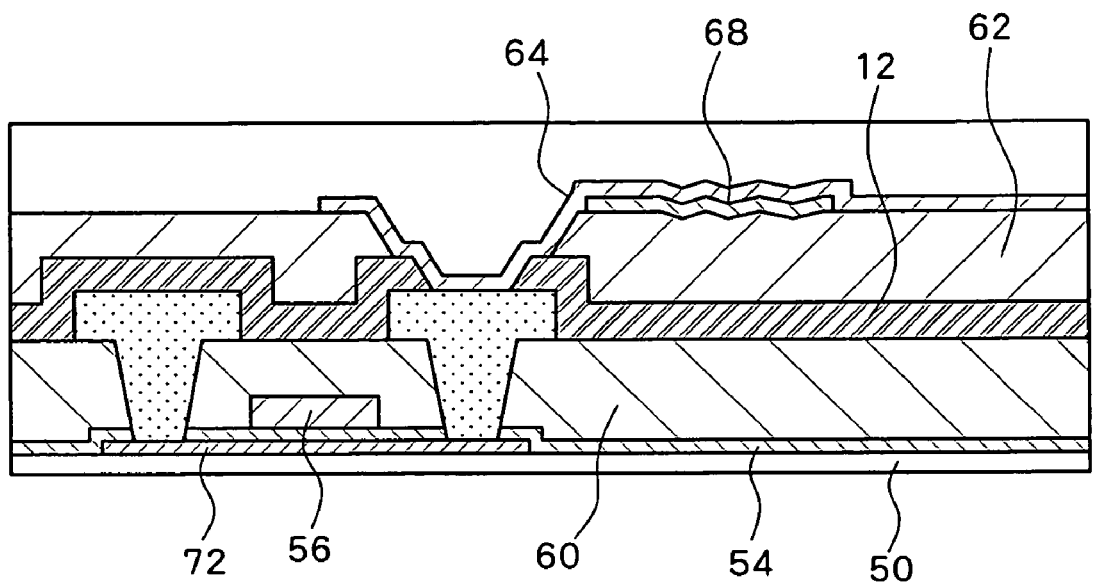
FIGS. 15A and 15B are cross sectional views of the pixel portion and the COG terminal portion, respectively, for showing the process procedure.
Figure 15B:
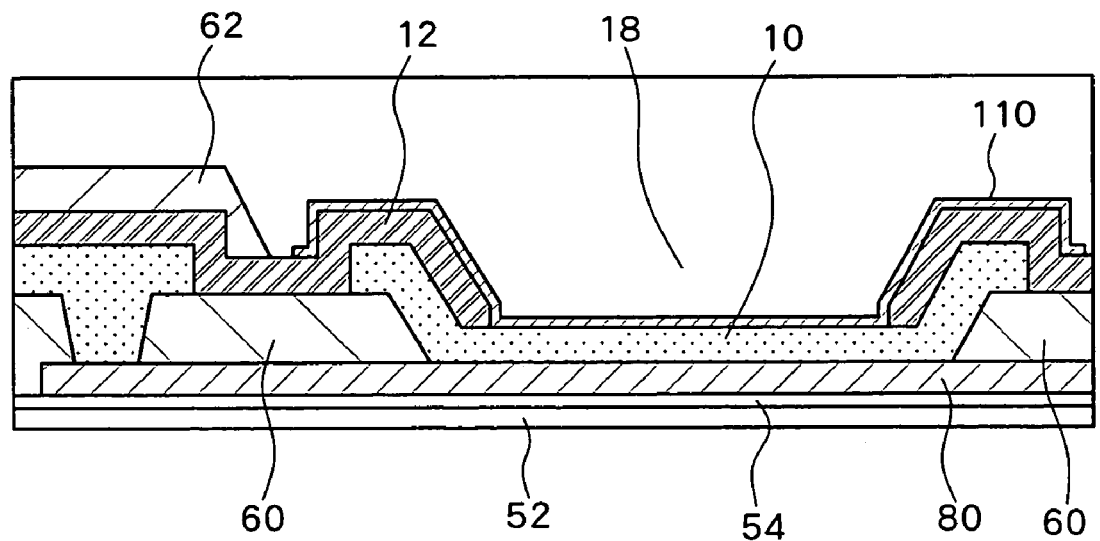

Subsequently, as shown in FIG. 15A, the pixel electrode 64 made of ITO is formed in the pixel portion (S27). At this time, in the COG terminal portion, the transparent conductive film 110 formed of ITO is formed so as to cover the removed portion 18 and the protective film 12 provided in the peripheral region of the removed portion 18, as shown in FIG. 15B. Actually, after an ITO film is formed by sputtering, this film is patterned by photolithography and wet etching to thereby form the pixel electrode 64 and the transparent conductive film 110. At this time, if a COG terminal portion 22 made of Al—Nd similar to the reflective film 68 is disposed on the surface in the COG terminal portion, it is preferable to perform etching which does not affect this Al—Nd film, such as that using oxalic acid $((COOH_2).2H_2O)$ as an etchant. In the present embodiment in which the COG terminal portion 22 is covered with the transparent conductive film 110, however, various kinds of etchants can be used.

Here, in a transmissive panel, it is not necessary to form the reflective film 68 or the uneven surface in the planarization film 62.

As described above, the structure of the COG terminal portion shown in FIG. 1 is formed by using the manufacturing process in the pixel portion. Then, an appropriate number of bumps 26a are disposed on the transparent conductive film 110 having a concave shape in the COG terminal portion, thereby connecting the horizontal driver IC.

It should be noted that the structure of the terminal portion on the output side of the horizontal driver IC has been described above. On the input terminal side of the horizontal driver IC, the similar COG terminals are provided on the substrate side to achieve the similar connection using the COG structure.

In addition, an OLB terminal portion to which an external signal line (FPC or the like) is connected is further formed in the periphery of the COG terminal. This OLB terminal portion has basically the same structure as that of the COG terminal portion.

Figure 16:
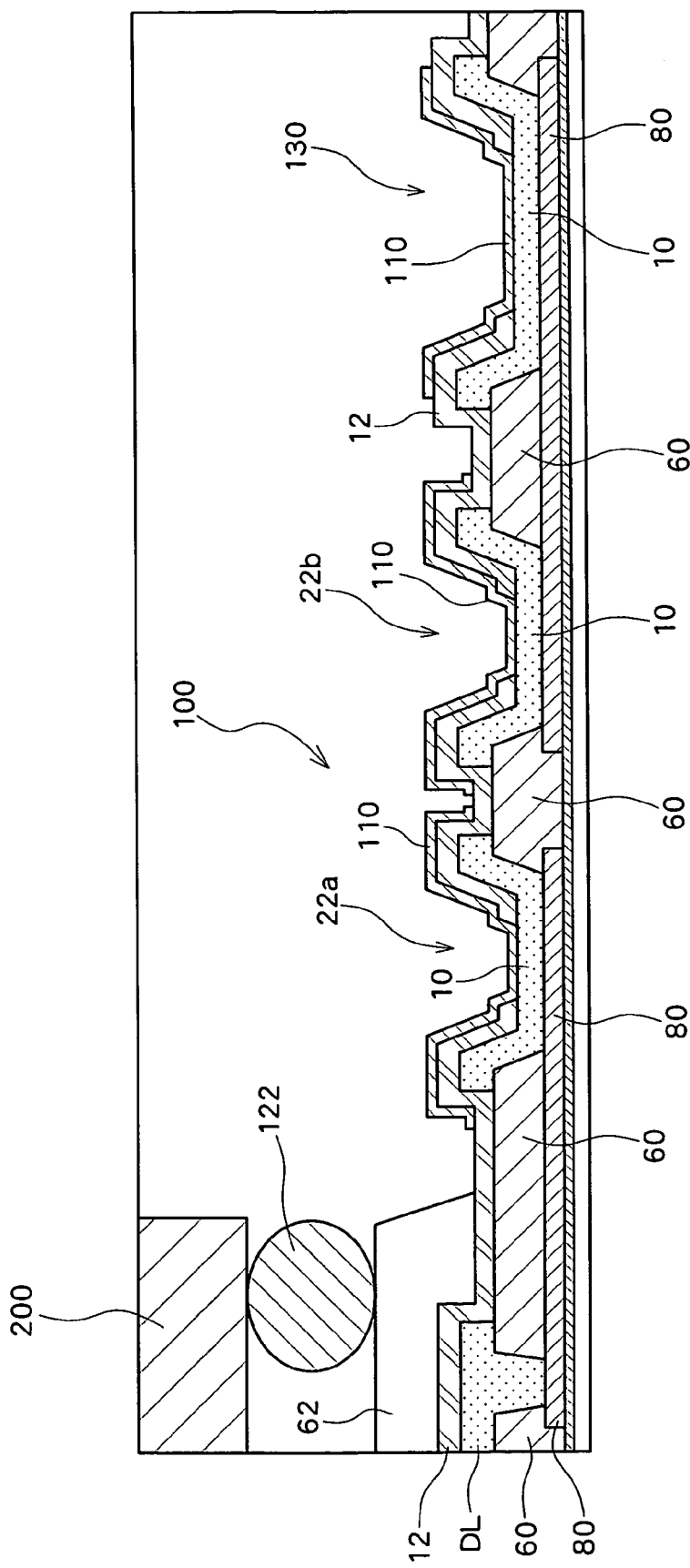
FIG. 16 is a view showing an overall structure of the terminal portion.

FIG. 16 is a view showing an overall structure of the terminal portion. The opposing substrate 200 on which the common electrode is formed is disposed so as to oppose the TFT substrate 100. The peripheral portion of this opposing substrate 200 and the opposing peripheral portion of the planarization film 62 on the TFT substrate 100 are sealed using a seal 122, with the liquid crystal being sealed between these substrates.

The COG terminal portion 22 shown in FIG. 1 is formed outside this seal 122. The COG terminal portion 22 is used for connection with the horizontal driver IC 26 and includes a COG terminal portion 22a for a signal output from the horizontal driver IC and a terminal portion 22b for a signal input to the horizontal driver IC. These COG terminal portions 22a and 22b have basically the same structure in which the connection portion 10 and the transparent conductive film 110 are layered on the molybdenum line 80 which is separated by the interlayer insulating film 60. The molybdenum line 80 in the COG terminal portion 22b further extends towards the outside and reaches the OLB terminal portion 130. This OLB terminal portion 130 is a terminal portion to which a flexible cable or the like is connected for inputting various external signals into the TFT substrate 100, and has a structure similar to that of the COG terminal portion 22 in which the connection portion 10 and the transparent conductive film 110 are layered on the molybdenum line 80.

As described above, according to the present embodiment, the OLB terminal portion 130 and the COG terminal portion 22b are connected by the molybdenum line 80. This molybdenum line 80 is formed in the same process as the process in which the gate electrode is formed in the pixel portion. Accordingly, as the molybdenum line 80 which forms the COG terminal portion 22a and the molybdenum line 80 which forms the COG terminal portion 22b can be formed such that they are separated by the interlayer insulating film 60, it is possible to form the COG terminal portion 22 and the OLB terminal portion 130 simultaneously without performing any additional process.

An external video signal for display is input to the horizontal driver IC 26 via the OLB terminal portion 130 and the COG terminal portion 22b, and the signal from the horizontal driver IC 26 is supplied, via the COG terminal 22a, to each pixel provided inside the panel.

Further, in the present embodiment, the circuit pattern in the region outside the seal 122 where the opposing substrate 200 is not provided is formed using the molybdenum line 80, with a conductor including a layer of aluminum or aluminum alloy being used only in the connection portion 10. More specifically, while a conductor including a layer of aluminum or aluminum alloy is used as the connection portion 10 in the COG terminal portion and the OLB terminal portion in the region outside the seal 122, the molybdenum line 80 is used for forming the circuit pattern in this region.

Thus, durability of the display panel is increased in the region outside the seal 122 which is exposed to the external air, by using no aluminum or aluminum alloy which has relatively low resistance to corrosion or the like.

Figure 17:
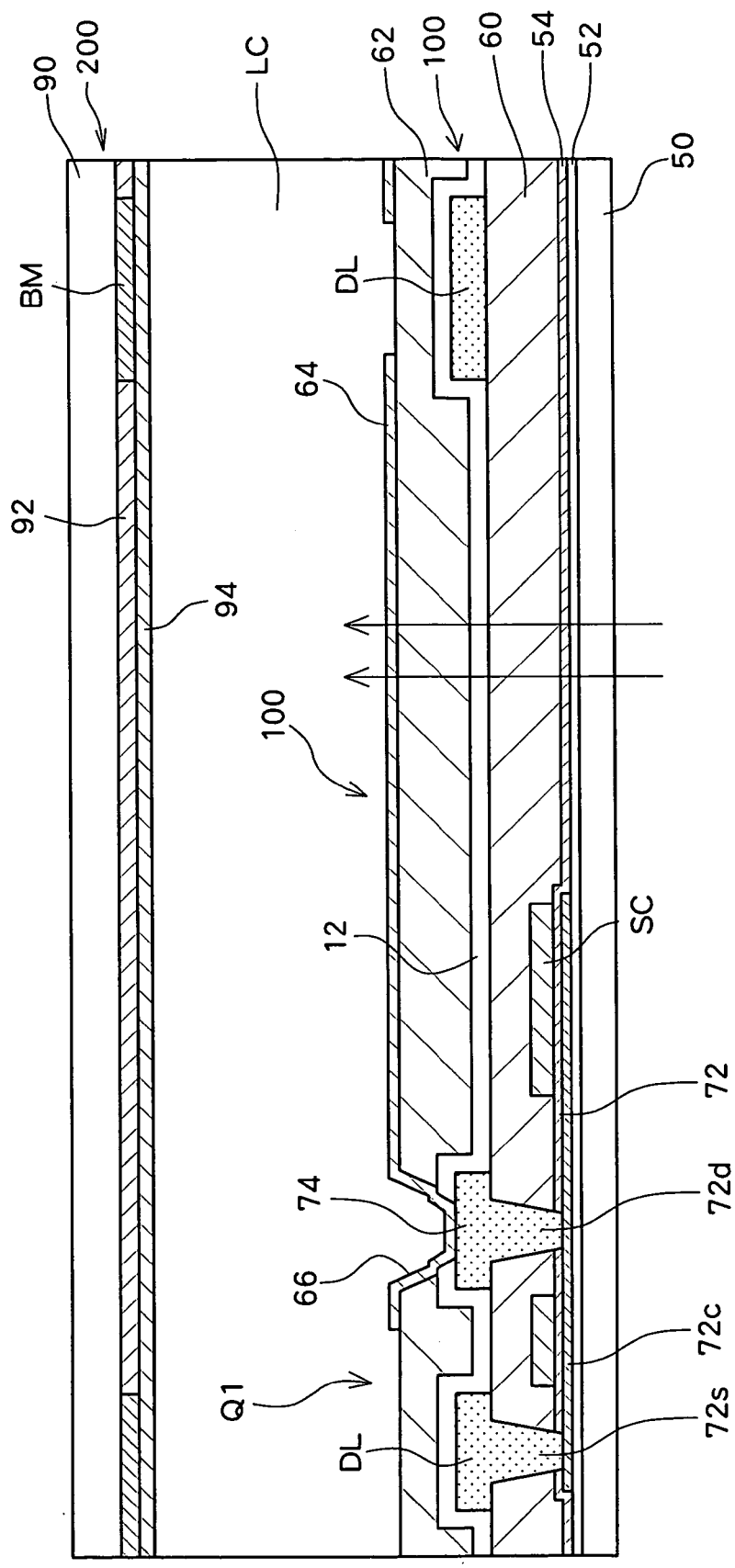
FIG. 17 is a view showing a structure of a transmissive pixel portion.
Figure 18A:
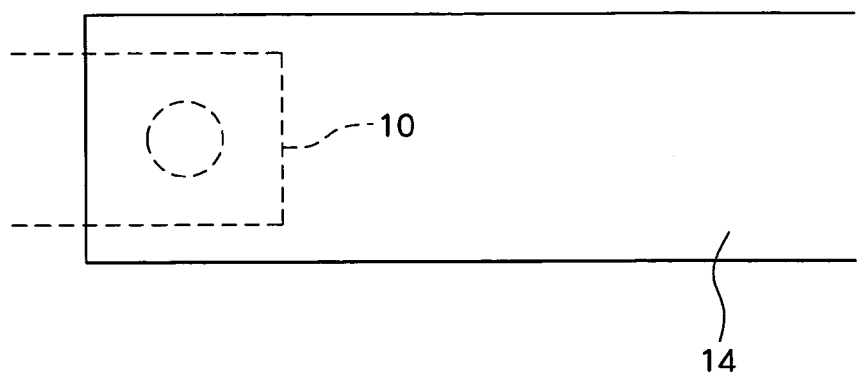
FIGS. 18A and 18B are views showing a conventional structure of the terminal portion.
Figure 18B:
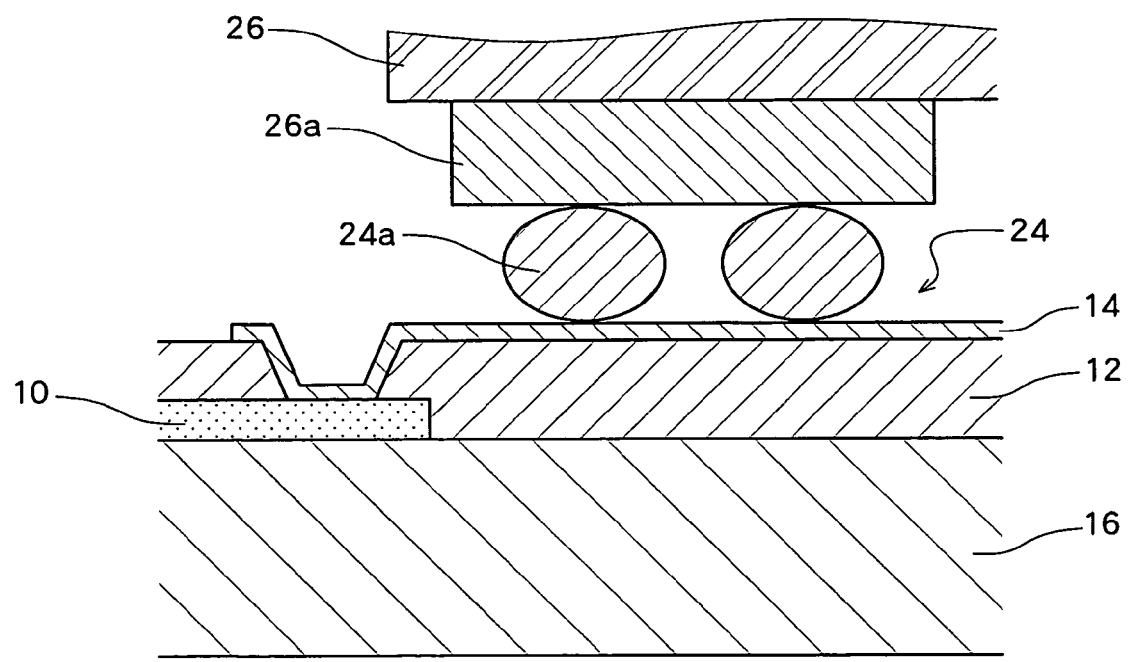

FIG. 17 shows a structure of the pixel portion in a transmissive liquid crystal display apparatus. In contrast to the structure of a transflective display apparatus shown in FIG. 3, in the structure shown in FIG. 17, no reflective film 68 is formed, and the pixel electrode 64 and the opposing electrode 94 are formed to have a flat surface.

As described above, according to the present embodiment, in the COG terminal portion to which the horizontal driver IC is connected, the transparent conductive layer 110 made of ITO is formed on the metal (aluminum (Al) or an aluminum alloy (a conductor including an AlNd layer) which is used for the data line DL. Consequently, it is possible to prevent an oxide film from being formed in the COG terminal portion to thereby reduce the contact resistance. Further, because the COG terminal portion is formed with the planarization film being removed therefrom, sufficient rigidity can be achieved for allowing reliable connection. In addition, because the data line DL and the connection portion 10 in the portion other than the removed portions 18 are covered with the planarization film, sufficient protection can be achieved. Also, because the COG terminal portion is formed without providing the planarization film 62 on the connection portion 10, sufficient pressure can be applied to the bump 26a for connecting and fixing the horizontal driver IC with respect to the display panel.

It should be noted that the structure of the present embodiment is applicable to any of transmissive, transflective, and total internal reflection panels.

While the preferred embodiment of the present invention has been described using specific terms, such description is for illustrative purposes only, and it is to be understood that changes and variations may be made without departing from the spirit or scope of the appended claims.

What is claimed is:

1. An active matrix display apparatus having a Chip On Glass COG terminal portion for directly connecting with a separate semiconductor integrated circuit in a peripheral portion, wherein the COG terminal portion includes:
    a connection portion which is formed of a conductor including a layer of aluminum or an aluminum alloy and which is disposed in the peripheral portion;
    a line protective film which covers the connection portion;
    an opening portion which is formed in the line protective film at a location corresponding to a terminal portion; and
    a transparent conductive layer which covers a surface of the connection portion in the opening portion.

2. A display apparatus according to claim 1, wherein
    the COG terminal portion includes a signal receiving COG terminal portion for receiving a signal from the separate semiconductor integrated circuit and a signal supplying COG terminal portion for supplying a signal to the separate semiconductor integrated circuit;
    each of the signal receiving COG terminal portion and the signal supplying COG terminal portion includes the connection portion, the line protective film, the opening portion, and the transparent conductive layer; and
    the connection portion in the signal receiving COG terminal portion is connected, via a line located below, with an internal line which is connected to a pixel within the display apparatus, and the connection portion in the signal supplying COG terminal portion is connected, via a line located below, with an OLB terminal which is separately provided for receiving an external signal.

3. A display apparatus according to claim 2, wherein the line located below the connection portion for connecting the connection portion with the internal line and the line located below the connection portion for connecting the connection portion with the OLB terminal are a molybdenum line.

4. A display apparatus according to claim 2, wherein
    a display element which uses a transparent conductor as an electrode is provided in each pixel in a display portion of the display apparatus, and
    the transparent conductive layer in the signal receiving COG terminal portion, the signal supplying COG terminal portion, or the OLB terminal portion, and the electrode formed by a transparent conductor in each pixel are formed in the same process.

5. A display apparatus according to claim 2, wherein the transparent conductive layer in the signal receiving COG terminal portion, the signal supplying COG terminal portion, or the OLB terminal portion is formed so as to cover the line protective film in the periphery of the opening portion.

6. A display apparatus according to claim 2, wherein the transparent conductive layer in the signal receiving COG terminal portion, the signal supplying COG terminal portion, or the OLB terminal portion is formed of ITO.

7. A display apparatus according to claim 2, wherein the internal line is a data line for supplying a data signal to each pixel within the display apparatus, each pixel includes a thin film transistor having one end connected to the data line, and a transistor protective film which covers the thin film transistor, and the line protective film in the signal receiving COG terminal portion, the signal supplying COG terminal portion, or the OLB terminal portion and the transistor protective film are formed in the same process.

8. A display apparatus according to claim 2, wherein the OLB terminal also includes:

a connection portion which is formed of a conductor including a layer of aluminum or an aluminum alloy;

a line protective film which covers the connection portion;

an opening portion which is formed in the line protective film at a location corresponding to a terminal portion; and a transparent conductive layer which covers a surface of the connection portion in the opening portion.

9. A display apparatus according to claim 8, wherein a thin film transistor for controlling display is provided in each pixel in a display portion of the display apparatus, the thin film transistor includes a semiconductor layer, a gate insulating film which covers the semiconductor layer, a gate electrode which is provided in a portion of the gate insulating film which corresponds to a position above a channel region of the semiconductor layer, and an interlayer insulating film which covers the gate electrode and the gate insulating film, and a separate line which connects the connection portion of the signal receiving COG terminal portion with the internal line and a separate line which connects the connection portion of the signal supplying COG terminal portion with the OLB terminal are formed in the same process as a process in which the gate electrode is formed.

10. A display apparatus according to claim 1, wherein the line protective film is a silicon nitride film.

* * * * *